Dec. 19, 1961    K. GEBELE    3,013,478
PHOTOGRAPHIC CAMERA
Filed Sept. 22, 1960    4 Sheets-Sheet 3

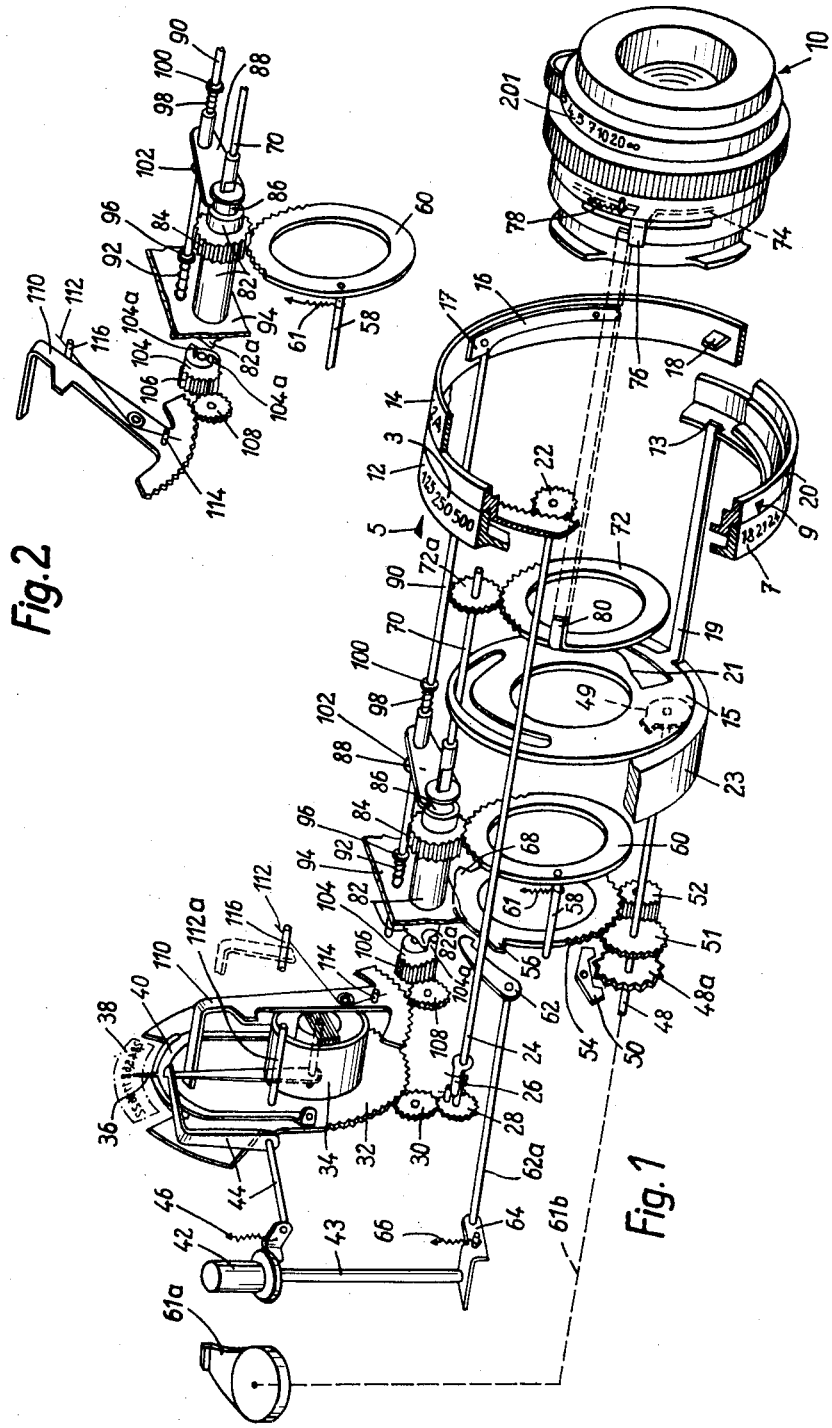

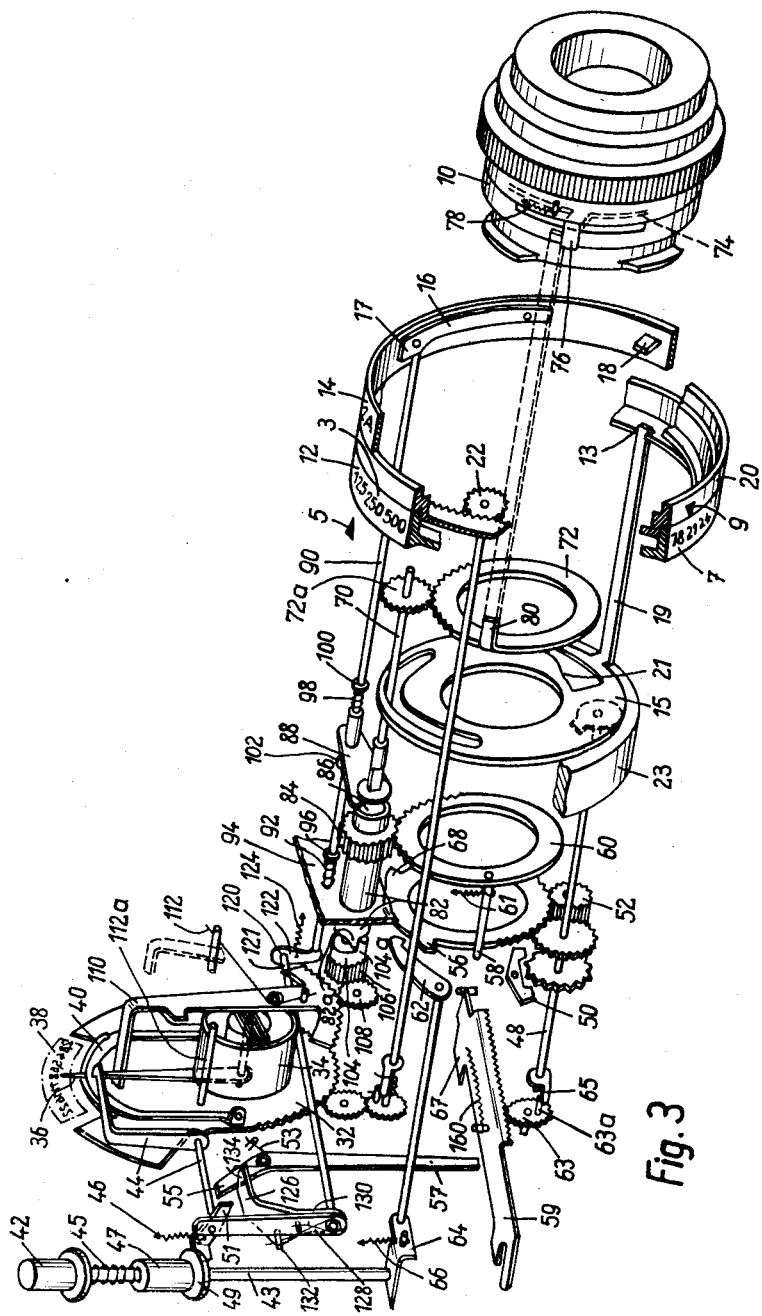

Dec. 19, 1961 K. GEBELE 3,013,478
PHOTOGRAPHIC CAMERA
Filed Sept. 22, 1960 4 Sheets-Sheet 4

United States Patent Office 3,013,478
Patented Dec. 19, 1961

3,013,478
PHOTOGRAPHIC CAMERA
Kurt Gebele, Munich, Germany, assignor to Compur-Werk Friedrich Deckel oHG, Munich, Germany, a German firm
Filed Sept. 22, 1960, Ser. No. 57,785
Claims priority, application Germany Sept. 23, 1959
14 Claims. (Cl. 95—10)

The present invention relates to a photographic camera and, more particularly, to setting the exposure value of a still camera.

An object of the invention is to provide a generally improved and more satisfactory exposure value setting mechanism for a photographic camera.

Another object is the provision of a new and improved mechanism for manually setting the shutter speed and for automatically setting the diaphragm aperture in accordance with the indications of an exposure meter, having regard for the previously set shutter speed.

Yet another object is to provide a new and improved mechanism for automatically setting both the shutter speed and the diaphragm aperture, so that completely automatic setting of the exposure value is achieved.

A further object of the invention is the provision of a mechanism of the foregoing types which may optionally be operated manually to set selected speeds and apertures.

A still further object is to provide an exposure value setting device including an exposure meter having a pointer which may be clamped and engaged by a feeler member for setting the diaphragm aperture and possibly also the shutter speed, and wherein upon manual setting of aperture and speed, the exposure meter remains active even though the feeler member is disconnected and ineffective as a stop.

Another object is the provision of a device as herein described for automatically setting the diaphragm aperture in accordance with the position of a clamped exposure meter pointer, the pointer being clamped by operating the camera release, and having means for holding the pointer clamped even though the camera release is let go, this holding means being ineffective to clamp the pointer when setting manually.

These and other desirable objects may be attained in the manner disclosed as an illustrative embodiment of the invention in the following description and in the accompanying drawings forming a part hereof, in which:

FIG. 1 is a schematic exploded perspective view of the essential drive members in an embodiment of the invention which provides for manual setting of the shutter speed and automatic setting of the diaphragm aperture;

FIG. 2 is an enlarged schematic perspective view of a portion of the structure of FIG. 1, showing a claw toothing in disengaged position;

FIG. 3 is a view similar to FIG. 1 of a modification of the invention having the addition of further control of the clamping of the pointer;

The same reference numerals throughout the several views indicate the same parts.

The present invention represents a further development and refinement in the recently active art of modern automatic setting mechanisms for photographic cameras. The following disclosure is addressed to those skilled in this art as it has developed up to the present time. For the sake of brevity, the disclosure presupposes that the reader is thoroughly familiar with both the principles of operation and the specific construction of prior mechanisms of this kind, as exemplified for instance in cameras currently on the market and in prior patent applications such as:

Gebele, Serial No. 803,204, filed Mar. 31, 1959.
Gebele, Serial No. 842,145, filed Sept. 24, 1959.
Gebele, Serial No. 853,648, filed Nov. 17, 1959, (now Patent 2,969,004, granted Jan. 24, 1961).
Gebele and Singer, Serial No. 13,082, filed Mar. 7, 1960.

Figure 5:
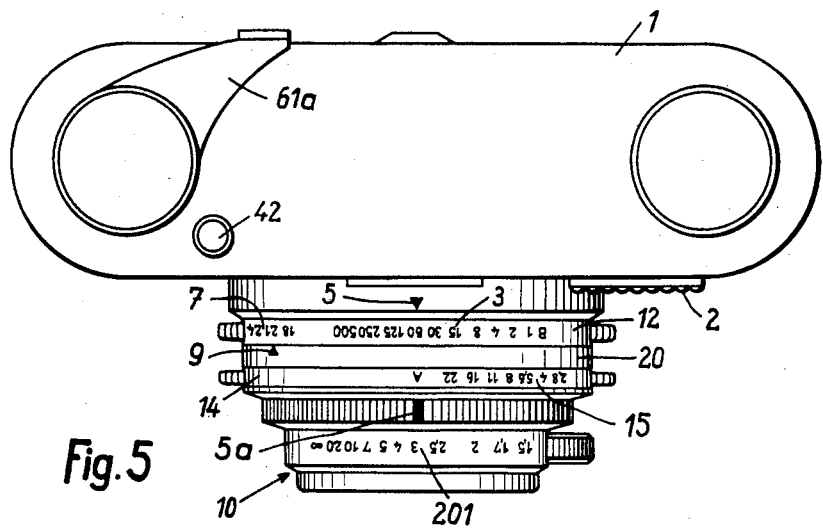
FIG. 5 is a general view of a camera equipped with setting mechanism according to the present invention.

Referring first to FIG. 5, there is shown somewhat schematically a camera (e.g., a 35 millimeter camera) having a main body 1 on the front wall of which is mounted a conventional photoelectric cell of a light meter. The usual honeycomb lens of the photoelectric cell is shown at 2. Also on the front wall of the camera body is a shutter assembly or unit having the conventional shutter speed or time adjusting member or setting member in the form of a ring 12 rotatable on the outside of the unit around the optical axis of the shutter unit as a center of rotation. The shutter speed, or time of exposure for which the shutter is set, is shown by a conventional shutter speed scale 3 marked circumferentially on the ring 12 and read in conjunction with a fixed index mark or reference point 5 on a stationary part of the structure. The scale shown by way of example in FIG. 5 goes from 1 second to $\frac{1}{500}$ second, with a "B" or "bulb" setting position beyond the 1 second end of the scale.

In front of the ring 12 for setting the shutter speed or time of exposure, there is a film speed or film sensitivity setting member 20, also in the form of a ring rotatable about the optical axis as a center, releasably coupled to the ring 12 to turn therewith, but settable to different positions of orientation with respect to the ring 12 when the coupling is released, to enable the index mark or reference point 9 on the ring 20 to be brought opposite any desired one of the graduations of the film speed or sensitivity scale 7 marked circumferentially on the ring 12. The construction of the releasable coupling between the two rings is conventional, and may be, for example, like the coupling between the rings 20b and 22 in FIGS. 4 and 5 of the drawings of the above-mentioned application 803,204, or the coupling between the rings 22 and 40 in the mentioned application 842,145, or the coupling between the rings 18 and 22 in Gebele and Singer application 856,198, filed Nov. 30, 1959 (abandoned).

In front of the ring 20 is another ring 14, likewise rotatable about the optical axis, concentrically with the rings 12 and 20. The ring 14 constitutes a diaphragm aperture setting or controlling member, which may be turned to bring any selected graduation of the diaphragm aperture scale 15 opposite the index mark 5 or, if desired, a separate fixed index mark 5a preferably alined with the mark 5. The aperture scale 15 is graduated in terms of the usual $f$ number stops, in the usual sequence, the largest stop or aperture depending, of course on the maximum speed of the particular lens. In the example shown, the aperture graduations run from $f:2.8$ to $f:22$. Beyond one end of the aperture scale is the graduation or designation "A" standing for "automatic." When the ring 14 is turned to bring the mark "A" opposite the mark 5 or 5a, the mechanism is positioned for automatic setting of the diaphragm aperture, in accordance with the amount of light falling on the photocell 2. In any other position of the ring 14, the diaphragm aperture will not be set automatically but will be set (when the camera is released or tripped to make an exposure) to the aperture indicated by the particular numerical graduation of the scale 15 which has been manually positioned opposite the mark 5 or 5a.

It will be apparent as the description proceeds that the operation of the diaphragm setting mechanism is not confined to those constructions in which the diaphragm leaves are permanently built into the shutter unit or assembly. The present construction can equally well control the aperture of diaphragm leaves built into an interchangeable lens unit. Such an interchangeable unit or assembly containing the lens (or at least some of the components or elements of the lens) and the diaphragm leaves is indicated in general at 10, and is connected to and disconnected from the stationary shutter unit by the usual conventional bayonet joint.

So much for the principal parts which are externally visible as seen in FIG. 5. The description of the principal interior operating parts of a first form or embodiment of the invention will now proceed with reference especially to FIGS. 1 and 2.

This first form of construction includes, in addition to the parts already described in conjunction with FIG. 5, an internal cam surface 16 formed circumferentially on the diaphragm aperture setting member 14, the cam having at 17 a rise in a rearward axial direction. The ring 14 also has an internal projection or stop lug 18.

The ring 20 has internal gear teeth in meshing engagement with a pinion 22 at the forward end of an axially extending shaft 24. The other end of the shaft 24 has a conventional spring coupling 26 with a pinion 28, and the pinion 28 is in meshing engagement with a reversing pinion 30 which in turn engages the partially toothed periphery of an exposure meter mounting plate 32. An exposure meter housing 34 is mounted on the plate 32 and contains a suitable conventional moving mechanism (e.g., a moving coil galvanometer electrically connected to and powered by the photocell 2) having a pointer 36 which is displaceable over a diaphragm aperture scale 38 marked in stationary position on the camera, preferably being marked on a transparent plate in position to be seen by an observer looking forwardly through the finder. With this arrangement, the film speed selected may be set by rotating the ring 12 relative to the ring 20 to aline the selected value on the scale 7 with the mark 9, whereafter the coupled rings 12 and 20 may be rotated together to set the desired shutter speed on the scale 12. During this adjustment, rotation of the ring 20 is transmitted through the pinion 22 and shaft 24 to rotate the mounting plate 32 and the meter pointer 36 by a corresponding amount. In this manner the film speed and shutter speed setting are introduced into the device for automatically setting the exposure value, as well understood by those skilled in this art and as more fully explained in the aforementioned application 842,145.

A shutter speed control ring is mounted for rotation about the optical axis and has an axially extending arm 19 which engages in a cut-out 13 in the speed setting member 12. The shutter blades and the shutter operating mechanism with which the control ring 15 is operative are conventional and therefore are not shown on this drawing, but may, for example, take the form disclosed in any one of Gebele Patents 2,900,885 and 2,900,886, issued August 25, 1959, and 2,943,551, issued July 5, 1960. A conventional control pin (not shown) within the shutter housing 23 lies against the conventional cam surface 21 of the speed control ring 15, and upon displacement of the ring 15 the position of the pin is adjusted radially by the cam surface 21, to control the shutter speed in the well known manner.

Pivoted to the exposure meter mounting plate 32 is a stirrup-like clamping strap 40 which presses the pointer 36 against the plate 32 when a clamping shaft and lever assembly 44 is swung by downward finger pressure on a camera release plunger 42. The meter pointer 36 is clamped in this manner at an indicating position according to the brightness conditions then existing, the pointer being pressed between the clamping member 40 and the mounting plate 32. The pointer is released when the plunger 42 is let go and the spring 46 swings the lever assembly 44 away.

A cocking or tensioning shaft 48 extends parallel to the optical axis and has fixed to its forward end a tensioning disk 49 for tensioning the main drive member or master member of the shutter mechanism preferably simultaneously with the advancement of the film. The master member and the means for tensioning it may be of any suitable known form, the details of which are unimportant for purposes of the present invention and therefore not shown here. It is sufficient to say that the tensioning disk 49 may serve to tension the master member in the same way as is done by the tensioning disk 22 in Patent 2,900,885 or the tensioning disk 16 in Patents 2,900,886 and 2,943,551. Also fixed to the tensioning shaft 48 is a star wheel 48a engaging a vibrating anchor or pallet 50 to control the speed of the return movement or running-down movement of the shaft 48 and parts connected thereto, from tensioned position to rest position. The shaft 48 also has fixed to it a gear 51 which meshes with a motion-reversing pinion 52 which meshes also with gear teeth on the periphery of a tensioning ring or control ring 54, which rotates about the optical axis of the shutter as a center of rotation, concentrically with the other rings previously mentioned. This tensioning ring 54 has a projection 56 which engages a pin 58 on an intermediate ring 60 when the ring 54 is moved in a counterclockwise direction against the force of a spring 61 which tends to turn the ring 60 clockwise.

As mentioned above, the tensioning movement of the shaft 48 is preferably accomplished by the movement of the film winding or advancing member. Various constructions for doing this are well known (see for example the above mentioned Patents 2,900,885 and 2,900,886) and any conventional coupling of the shaft 48 to the film winding member 61a may be used, as indicated schematically by the broken connecting line 61b in FIG. 1.

The rings 54 and 60 are held or latched in their fully tensioned position by the engagement of a locking pawl 62 behind a projection 63 on the ring 54. The locking pawl 62 is connected through a shaft 62a with a release lever 64 underlying the pin 43 of the camera release plunger 42, downward pressure on the release plunger acting against a spring 66 to release the engagement of the pawl 62.

Figure 6:
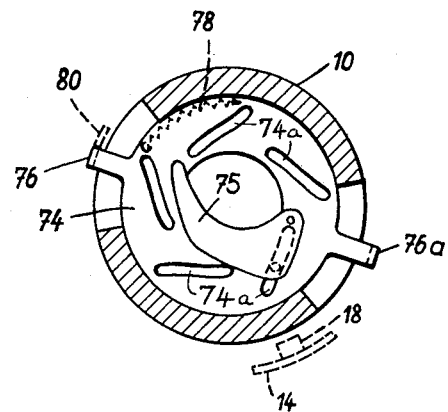
FIG. 6 is a cross section through the lens unit, showing the diaphragm actuating means.

When the film winding member 61a is operated to advance the film to the next exposure area or "frame" and simultaneously to turn the shaft 48 in a tensioning direction, the tensioning movement is transmitted from the intermediate ring 60 through a counter shaft 70 to a diaphragm control ring 72. In the interchangeable lens unit 10 is located another rotatable ring 74 which may be called broadly a diaphragm aperture control ring, or more specifically a diaphragm actuating ring. This ring has a radial stop arm 76 which has a bent-over end which engages resiliently, under the action of a spring 78, against the axially extending bent-over end of a radial arm 80 on the diaphragm control ring 72. Consequently the ring 74 is also moved into a tensioned position during the tensioning movement. The ring 74 also has the usual conventional oblique slots 74a (FIG. 6) for controlling the positions of the usual conventional iris diaphragm leaves 75.

A coupling claw or clutch member 82 rigid with a pinion 84 comprises two saw teeth 82a and is non-rotatably mounted but axially displaceable on the rear end of the counter shaft 70, the pinion 84 being wide enough (in an axial direction) to remain in engagement with the partially toothed periphery of the intermediate ring 60 throughout the range of axial movement of the clutch member 82. The other or forward end of the shaft 70 is fixed to a pinion 72a which is in meshing engagement with the partially toothed periphery of the ring 72. By means of the shaft 70 and the gears 84 and 72a, the ring 72 is always coupled to the ring 60 to turn therewith, so that functionally the two rings may be considered as one, being divided into two merely for convenience.

The coupling claw or clutch member 82 has an annular groove 86 in which a shift lever 88 engages to effect the axial displacement. The shift lever 88 is seated in an axially displaceable manner on a shift pin 90. On the shift pin 90 is a coiled compression spring 92 surrounding the pin 90 and having its one end resting against a wall 94 of the camera housing, while its other end rests against a collar 96 fixed to the shift pin 90. The spring 92 presses the shift pin 90 forwardly against the cam surface 16, 17 on the diaphragm setting ring 14. Another compression spring 98 also surrounds the pin 90 and rests at its forward end against a second collar 100 fixed to the shift pin 90, and at its other end against the shift fork 88, to tend to press the shift fork 88 rearwardly against a third collar 102 (see FIG. 2) fixed to the shift pin 90. The coupling claw 82 is engageable with a coupling claw 104 comprising two saw teeth 104a and constituting the other member of a separable coupling or clutch. Fixed to the clutch part 104 is a pinion 106 which is connected through a reversing pinion 108 with an arcuate rack or gear tooth segment on a meter pointer feeler member 110.

The feeler member 110 is mounted to swing approximately coaxially with the meter pointer 36. One end of a spring 112 bears against a pin 114 on the feeler member 110, while its other end bears against a stationary stop pin 116, the effect being to urge the feeler member 110 against the stop pin 116 as shown in dotted lines in FIG. 1.

As already mentioned, the diaphragm aperture setting member 14 has an automatic position in which the mark "A" is alined with a suitable index, and the ring 14 also has a plurality of manually set positions for setting selected diaphragm apertures on the shutter. With the ring 14 in its position for the automatic setting of the diaphragm aperture, the projection 17 on the cam surface 16 presses the shift pin 90 rearwardly, carrying with it the shift fork 88 which moves the coupling claw 82 into engagement with the coupling claw 104. The spring 92 is thereby tensioned in a compressing direction.

Upon the release of the previously tensioned or cocked camera by depressing the release plunger 42, the meter pointer 36 is clamped fast against the mounting plate 32 in the manner already described. At the same time the release pin 43 presses against the lever 64 and swings the locking pawl 62 to release the rings 54 and 60 for running down movement in a clockwise direction toward a rest position under the action of the spring 61. Running down movement is transmitted through the pinion 84 to the engaged coupling claws 82 and 104, and to the feeler member 110, which swings counterclockwise toward the clamped position of the pointer 36. The running down movement is stopped when the feeler 110 comes into contact with the clamped pointer 36, and the running down movement is slowed down sufficiently, by the escapement 48a, 50, so that there is no damaging impact when the feeler meets the pointer. The running down movement is transmitted through the counter shaft 70 to the diaphragm control ring 72, and the movement of its arm 80 allows the other diaphragm control ring or actuating ring 74 to follow along to the same extent, under the influence of its spring 78. The movement of the ring 74 serves in the conventional known manner to swing the diaphragm blades from a tensioned position of maximum aperture toward a minimum aperture rest position under the action of the spring 78. As above stated, the running down movement comes to a stop when the feeler member 110 strikes the clamped meter pointer 36. At this point the diaphragm aperture has been automatically adjusted to the appropriate diaphragm aperture for the brightness conditions being measured, taking into account the previously manually selected shutter speed and film speed set by rotating the meter mounting plate 32 as previously described. Although the running down movement of the ring 60 is stopped by contact of the feeler with the meter pointer, the running down movement of the main shutter control ring 54 continues through its full range in the usual known manner, and just before the end of its running down movement it performs the conventional function of releasing the master member so that the latter can open and close the shutter blades in known manner to make the exposure. This being well known, the details are not important for purposes of the present invention, but such details may be the same as in the above mentioned Patents 2,900,885 or 2,900,886, or 2,-943,551.

Upon disconnecting the automatic diaphragm setting mechanism by rotating the ring 14 out of the "A" position to any one of the manually set diaphragm positions, the projection 17 of the cam surface 16 moves out of engagement with the shift pin 90, which is now urged forwardly under the action of the tensioned spring 92. The shift fork 88 is consequently displaced axially to withdraw the saw teeth 82a of the coupling claw 82 out of engagement with the saw teeth 104a of the coupling claw 104, as shown in FIG. 2. Upon the opening of this coupling, the feeler member 110 is now swung by the spring 112 out of the indicating range of the pointer 36 against the stop 116 and is held in this limit position. It may be mentioned at this point that the strength of the spring 61 tending (when the clutch 82, 106 is engaged) to swing the feeler in a counterclockwise direction is stronger than the force of the spring 112 tending to swing the feeler clockwise, so the spring 112 is really effective only when the clutch is disengaged.

The camera is now ready for operation by the manual setting of both the shutter speed and the diaphragm aperture. During manual adjustment the exposure meter remains active and may be read, even though the feeler member 110 is disconnected. This is advantageous since it is often desirable to adjust the camera in accordance with the reading of the exposure meter when setting manually. The exposure time is adjusted in the same manner as before by adjusting the speed setting ring 12. The manual setting of the diaphragm is effected by initially setting the ring 14 to the desired value on the diaphragm aperture scale 15 (FIG. 5). The ring 14 has a stop lug 18 which extends into the path of a second stop lug 76a on the diaphragm actuating ring 74, similar to the illustrated lug 76 but at a different point on the periphery of the ring. The diaphragm actuating ring 74, as in the case of automatic operation, is brought into the tensioned position by the arm 80, then upon release of the camera and under the action of the spring 78 the ring follows the clockwise movement of the arm 80 until the above mentioned second stop lug 76a of the ring 74 engages against the stop lug 18 of the ring 14, thereby setting the diaphragm to whatever aperture is indicated by the position of the ring 14. Since the coupling claws 82 and 104 are out of engagement, rotation of the claw 82 during the running down movement is not transmitted to the feeler member 110, which is now ineffective and at its limit position outside the range of travel of the meter pointer 36.

The shifting to automatic operation can be effected in any operating condition of the camera, either cocked (tensioned) or run down (in rest position). It will be noted that the limiting position of the feeler member 110 against the stop 116 corresponds to its position when the camera is tensioned, since counterclockwise movement of the rings 54 and 60 upon tensioning the camera is transmitted to the feeler member 110 to move it clockwise against the stop pin 116. Thus when the camera is tensioned, the coupling claws 82 and 104 are oriented such that a tooth is opposite a gap (see the view in FIG. 2) and the engagement of the coupling is directly possible. Assuming that the camera is in this tensioned position and that the diaphragm setting ring 14 is adjusted from manual diaphragm position to the position for automatic operation, the shift pin 90 moves under the action of the projection 17 on the came surface 16 to immediately engage the coupling claws 82 and 104. Should the camera be untensioned when it is desired to shift from manual to automatic setting of the diaphragm, it is possible for tooth to come against tooth in attempting to engage the coupling claws 82 and 104. In this case, the shift fork 88 is held in the same axial position when the shift pin 90 moves forwardly, and the spring 98 is tensioned. Upon subsequently tensioning the camera, the coupling claw 82 is turned and the coupling engages, the shift fork 88 sliding rearwardly against the collar 102. The saw tooth development of the coupling claws 82 and 104 permits the claw 82 to ratchet past or slide resiliently past the teeth of the opposing claw 104, until reaching the tensioning position.

A modification or second embodiment of the invention is shown in FIG. 3. In this modification a device is provided for automatically assuring that the meter pointer 36 is held clamped between the stirrup-like member 40 and the mounting plate 32 so that automatic setting of the diaphragm may proceed to a completion even though the camera release plunger 42 is let go of prematurely. If such a device for holding the pointer clamped is not provided, then when the downward finger pressure is removed from the release plunger 42 the residual force in the spring 61 will cause the feeler 110 to move the pointer 36 all the way against its limit stop 112a, thereby causing unnecessary impact and shock and perhaps damaging the parts, for at this time the motion is not slowed down by the escapement 48a, 50. Therefore it is desirable to provide for continuance of clamping the pointer 36 until the camera is again tensioned or cocked. But on the other hand, when such continuance of clamping is provided, there is the undesirable drawback that the exposure meter cannot be read except when the camera is in tensioned or cocked condition. Since the feeler does not bear against the pointer when the camera is adjusted for manual diaphragm setting, this continuance of clamping is unnecessary when manual diaphragm setting is used, and indeed any clamping of the pointer is undesirable, even when the plunger 42 has been partially depressed at the commencement of the operation of taking a picture. Therefore this second embodiment of the invention provides not only the highly desirable "continuance of clamping" means, effective when automatic diaphragm setting is to be employed, but also a mechanism for rendering both the "continuance of clamping" means and in fact any pointer clamping means whatever completely inoperative or ineffective when manual diaphragm setting is to be employed, thereby enabling the exposure meter to be read when the camera is run down or untensioned as well as when it is cocked or tensioned, and to be read and to be responsive to light changes even during the making of the exposure.

In this second embodiment (FIG. 3) a spring 45 is mounted on the release pin 43 below the plunger 42 and presses downwardly against a sleeve 47 having a collar 49. The collar 49 rests upon the rear arm of a two-armed lever 51 fixed to the shaft 44, so that the lever is swung when the camera release button 42 is depressed, to swing the shaft and lever assembly 44 and clamp the meter pointer 36 so long as pressure on the button 42 is continued. However, according to the invention as the lever arm 51 is swung upwardly the upper arm 55 of a lever 57 pivoted on a fixed pivot in the camera moves under the forward arm or tail of the lever 51, under the action of a spring 53. The clamping of the pointer 36 is thus continued even though the camera release plunger 42 is let go.

Upon the tensioning of the camera preferably with the advancement of the film, a slide 59 is pulled to the left as shown in FIG. 3 against the action of a return spring 160. The movement of the slide 59 is arranged to actuate the tensioning shaft 48. To this end, the slide 59 has a toothed rack in engagement with a pinion 63 having a driving pin 63a which engages the driving lug 65 on the tensioning shaft 48. At the same time, a projection 67 on the slide 59 engages the lower end of the lever 57 and swings the lever 57 in a clockwise direction to release the tail of the lever 51 for downward movement by the action of the spring 46. In this manner the clamping of the pointer 36 is released when the camera is tensioned, ready to make a new brightness measurement for the next exposure.

Another device is provided to render ineffective the continuance of clamping of the pointer 36, when the camera is adjusted for manual setting of the diaphragm aperture, even when the camera is untensioned. For this purpose, the rear end of the shift pin 90 cooperates with another lever mechanism 120. This lever mechanism includes a transverse shaft 121 rotatably supported in the camera, to which is fixed a lever 122, the end of the lever 122 being urged against the rear end of the shift pin 90 by a spring 124. At the other end of the shaft 121 is firmly secured a lever 126, while another lever 128 is pivoted on the shaft 121 and is urged by a spring 130 against a stop pin 132 on the lever 126. Upon shifting the diaphragm setting member 14 to a position for manual selection of a particular diaphragm aperture, the shift pin 90 moves forwardly and releases the lever 122 to follow along under the action of the spring 124. If the camera is already cocked or tensioned, the lever 128 swings in under the collar 49 as the lever 126 swings and the lever 128 follows along under the action of the spring 130. With this arrangement, the camera release plunger 42 can still be depressed to swing the lever 64 and release the latching pawl 62, even though the sleeve 47 is held upwardly by the lever 128 to prevent it from pressing on the lever 51 and clamping the meter pointer 36. If the camera is untensioned or run down at the time that the lever mechanism 120 is actuated, the clamping of the pointer 36 is still retained in effect due to the fact that the lever arm 55 supports the tail of the lever 51. In this case, the lever arm 55 extends into the field of swing of the lever 126, and an oblique cam edge 134 on the lever 126 forces the lever arm 55 out from under the tail of the lever 51, so that the clamping of the pointer 36 is eliminated. In all other respects except those above described, the embodiment of FIG. 3 may be the same as the first embodiment previously described.

Figure 4:
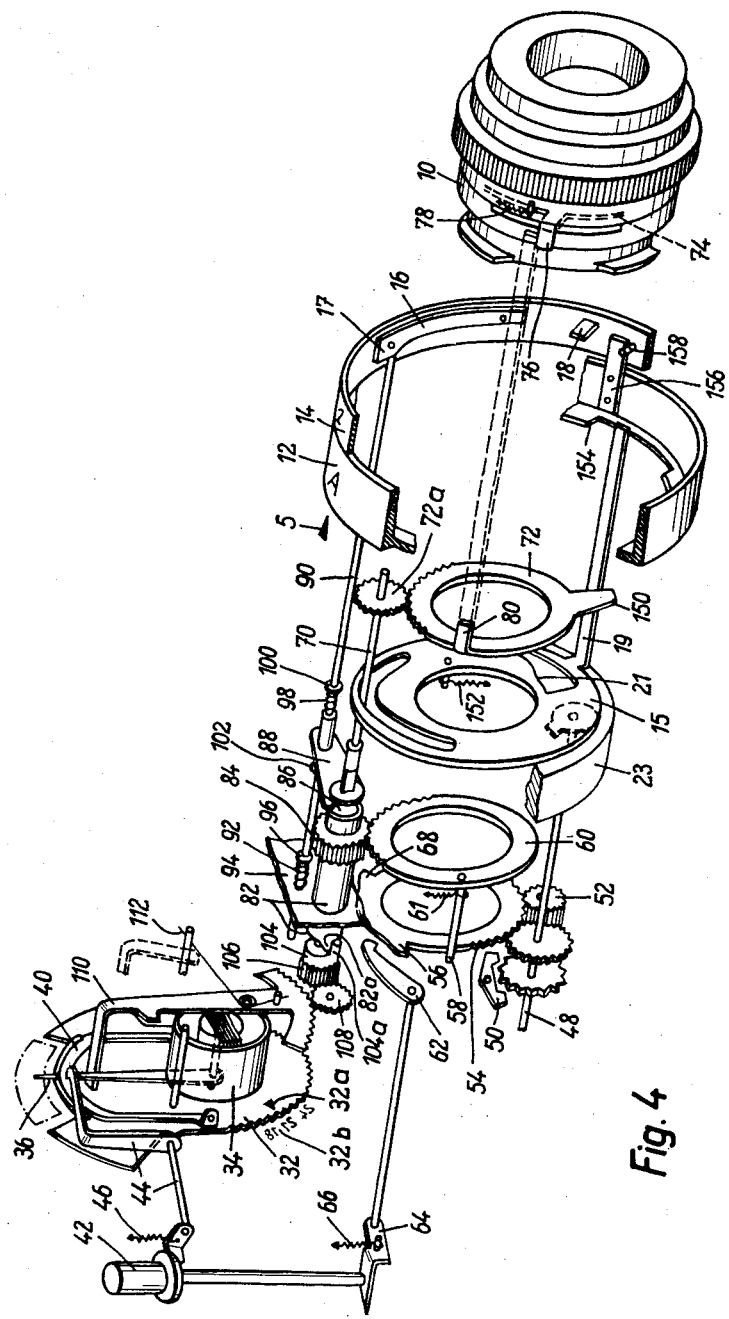
FIG. 4 is a schematic exploded perspective view of still another modification of the invention in which both the shutter speed and the diaphragm aperture may be set automatically.

The embodiment of the invention according to FIG. 4 is arranged to operate similar to FIG. 1, but has provision for setting the shutter speed automatically as well as the diaphragm aperture. To this end, the film speed ring 20 and the coupling between the ring 20 and the mounting plate 32, as shown in FIG. 1, are eliminated. Instead, the mounting plate 32 is frictionally retained in any position to which it may be rotated by hand in setting it for film speed or sensitivity, to bring an index mark 32a on the plate 32 opposite an appropriate graduation of the film speed or film sensitivity scale 32b marked on the camera body. The ring 12 has, as before, a shutter speed scale including a mark "A" to be alined with the index 5 for automatic setting of the shutter speed. The diaphragm control ring 72 has a driving projection 150 which transmits the tensioning motion to the arm 19 of the shutter speed control ring 15. The arm 19 is urged against the driving projection 150 by a spring 152 acting on the speed control ring 15.

Upon the release of the camera when set for automatic setting, both the shutter speed control ring 15 and the diaphragm aperture control ring 72 simultaneously run down to the position determined by the exposure meter pointer 36. As well known in the art (see for example the copending application Serial No. 853,648) the speed and diaphragm control rings are so oriented with respect to each other that a given time of exposure or shutter speed is normally associated with a given diaphragm aperture, as for example 1/30 second and f:2.8, and as the duration of exposure gets progressively shorter the diaphragm aperture gets progressively smaller, in accordance with progressively brighter light conditions. Tensioning or cocking of the shutter moves the diaphragm aperture control ring 74 to its position of maximum diaphragm aperture, whereas the shutter speed control ring is simultaneously moved to its longest speed position. Upon actuating the camera release, the diaphragm aperture becomes progressively smaller and smaller while the exposure time becomes correspondingly shorter and shorter until stopped at a position determined by the engagement of feeler 110 with the clamped pointer 36. It may be mentioned that upon moving the speed setting ring 12 to its automatic position, there is a lug 156 on the ring 12 which cooperates with a pin 158 on the diaphragm setting member 14 to turn the ring 14 to a position in which the stop lug 18 on the ring 14 is out of the path of the associated stop lug or second lug 76a on the diaphragm actuating ring 74.

For manual setting of the shutter speed setting ring 12, the shutter speed control ring 15 runs down until the arm 19 abuts against a stop edge 154 on the ring 12. The stop position of the control ring 15 then corresponds to the shutter speed set on the ring 12.

If the interchangeable lens unit 10 is a focusing type of lens mount (as is usually the case) rather than a fixed focus mount, it may carry a focusing distance scale 201 graduated in any suitable units of distance, such as meters.

All of the rings 12, 14, 15, 54, 60, 72, and 74 are control rings in a broad sense, and may be referred to as such when speaking broadly. When speaking more specifically, the rings 12 and 14 may conveniently be called setting rings, the rings 15 and 72 may be called control rings in a more limited sense, the ring 74 may be called an actuating ring for the diaphragm leaves, and the ring 54 is, of course, the main control ring of the shutter driving mechanism, corresponding to the control ring 144 in Patent 2,900,885, the control ring 44 in Patent 2,900,886, and the control ring 76 in Patent 2,943,551.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera adapted for automatic setting of the diaphragm aperture and optional manual setting thereof, said camera including a built-in exposure meter having a pointer, a rotatable diaphragm aperture control ring, means for moving said diaphragm control ring to a tensioned position and spring means tending to rotate said diaphragm control ring from said tensioned position toward a rest position, means for clamping said meter pointer at an indicating position according to the brightness conditions and for releasing said diaphragm control ring for running down movement, a feeler member swingable into the path of motion of said meter pointer, a coupling between said feeler member and said diaphragm control ring for rotating said feeler member upon release of said diaphragm control ring until stopped by engagement with the clamped pointer, whereby the diaphragm control ring is positioned automatically to the appropriate diaphragm aperture, said coupling being separable for movement from an engaged to a disengaged position, a diaphragm setting ring rotatable between an automatic position and a manual setting position, and means operated by movement of said diaphragm setting ring to the manual setting position for disengaging said separable coupling, so that said feeler member is disconnected and said exposure meter is readable during manual setting.

2. A construction as defined in claim 1, including a spring for loading said feeler member and swinging said feeler member to a limiting position out of the range of said meter pointer when said separable coupling is disengaged.

3. A construction as defined in claim 1, wherein said separable coupling comprises a claw coupling with saw teeth on each member thereof arranged so that the member coupled with the diaphragm control ring is turnable relative to the other member upon tensioning the camera.

4. A photographic camera adapted for automatic setting of the diaphragm aperture and optional manual setting thereof, said camera including a built-in exposure meter having a pointer, a rotatable diaphragm aperture control ring, means for moving said diaphragm control ring to a tensioned position and spring means tending to rotate said diaphragm control ring from said tensioned position toward a rest position, means for clamping said pointer at an indicating position according to the brightness conditions and for releasing said diaphragm control ring for running down movement, a feeler member swingable into the path of motion of said meter pointer, transmission means for connecting said feeler member and diaphragm control ring for rotating said feeler member upon release of said diaphragm control ring until stopped by engagement with the clamped pointer, said transmission means including a separable coupling movable from an engaged to a disengaged position, a diaphragm setting ring rotatable between an automatic position and a manual setting position, a cam surface on said setting ring, a shift pin biased into engagement with said cam surface, and means for disengaging said separable coupling in response to shifting of said shift pin by rotating said diaphragm setting ring to the manual setting position, whereby said feeler member is disconnected and the exposure meter is readable during manual setting.

5. A construction as defined in claim 4, wherein said separable coupling is a claw coupling and said disengaging means includes a shift fork engaged with one of the members of said claw coupling for axial sliding.

6. A construction as defined in claim 5, wherein said separable coupling is a claw coupling and said disengaging means includes a shift fork engaged with the member of said claw coupling which is connected with said diaphragm control ring, said shift fork being axially displaceable on said shift pin and biased by a spring, and the teeth of said claw coupling being arranged so that the member engaged by said shift fork is rotatable relative to the other member of said claw coupling during tensioning of the camera.

7. A photographic camera adapted for automatic setting of the diaphragm aperture and optional manual setting thereof, said camera including a built-in exposure meter having a pointer, a rotatable diaphragm aperture control ring, means for moving said diaphragm control ring to a tensioned position and spring means tending to rotate said diaphragm control ring from said tensioned position toward a rest position, means for clamping said meter pointer at an indicating position according to the brightness conditions and for releasing said diaphragm control ring for running down movement, a feeler member swingable into the path of motion of said meter pointer, transmission means for connecting said feeler member and diaphragm control ring for rotating said feeler member upon release of said diaphragm control ring until stopped by engagement with the clamped pointer, said transmission means including a separable coupling movable from an engaged to a disengaged position, a diaphragm setting ring rotatable between an automatic position and a manual setting position, shift means operated by movement of said diaphragm setting ring to the manual setting position for disengaging said separable coupling so that said feeler member is disconnected, and disconnecting means coupled with said means for clamping the meter pointer for disconnecting the clamping of the meter pointer when said separable coupling is disengaged.

8. A construction as defined in claim 7, wherein said means for clamping the meter pointer includes a release plunger having a pin on which a sleeve having a collar is slidable, the sleeve being pressed by the release plunger into engagement with a swinging lever, a locking lever pivotable to underlie said swinging lever to hold the meter pointer clamped, said disconnecting means including a bipartite lever mechanism including a first lever having a control edge adapted to press said locking lever out from under said swinging lever to release the clamping of said pointer when said shift means is operated by movement of said diaphragm setting ring to manually set position, and a second lever biased into engagement with said first lever and adapted to swing under the collar on said sleeve, to prevent said sleeve from being pressed down on said swinging lever.

9. A photographic camera of the type having an exposure meter including a pointer movable through an operating range in accordance with changes in brightness conditions, a camera release member operable to initiate a picture-taking operation, pointer clamping means normally operable by said camera release member to clamp said pointer in stationary position, a feeler member movable into engagement with the clamped pointer, and diaphragm aperture controlling mechanism including a part movable to one position for conditioning said aperture controlling mechanism for automatic operation in accordance with the position of said pointer as determined by engagement of said feeler member therewith and movable to another position for conditioning said aperture controlling mechanism for manual operation independently of the position of said pointer, characterized by means operated by movement of said part from automatic operation position to manual operation position for rendering said pointer clamping means ineffective.

10. A photographic camera of the type having an exposure meter including a pointer movable through an operating range in accordance with changes in brightness conditions, a camera release member operable to initiate a picture-taking operation, pointer clamping means normally operable by said camera release member to clamp said pointer in stationary position, a feeler member movable into engagement with the clamped pointer, and diaphragm aperture controlling mechanism including a part movable to one position for conditioning said aperture controlling mechanism for automatic operation in accordance with the position of said pointer as determined by engagement of said feeler member therewith and movable to another position for conditioning said aperture controlling mechanism for manual operation independently of the position of said pointer, characterized by means operated by movement of said part from automatic operation position to manual operation position for rendering said pointer clamping means ineffective and for simultaneously moving said feeler member to and holding it in a position outside of the operating range of said pointer.

11. A photographic camera of the type having an exposure meter including a pointer movable through an operating range in accordance with changes in brightness conditions, a camera release member operable to initiate a picture-taking operation, pointer clamping means normally operable by said camera release member to clamp said pointer in stationary position, a feeler member movable into engagement with the clamped pointer, and diaphragm aperture controlling mechanism including a diaphragm aperture control ring, a transmission connection between said control ring and said feeler member to couple one to the other for conjoint movement, and a setting member movable to one position for conditioning said aperture controlling mechanism for automatic operation in accordance with the position of said pointer as determined by engagement of said feeler member therewith and movable to another position for conditioning said aperture controlling mechanism for manual operation independently of the position of said pointer, characterized by a disengageable clutch in said transmission connection, and means including a cam on said setting member for disengaging said clutch upon movement of said setting member to manual operation position and for re-engaging said clutch upon movement of said setting member to automatic operation position.

12. A photographic camera of the type having an exposure meter including a pointer movable through an operating range in accordance with changes in brightness conditions, a camera release member operable to initiate a picture-taking operation, pointer clamping means normally operable by said camera release member to clamp said pointer in stationary position, a feeler member movable into engagement with the clamped pointer, and diaphragm aperture controlling mechanism including a diaphragm aperture control ring, a transmission connection between said control ring and said feeler member to couple one to the other for conjoint movement, and a setting member movable to one position for conditioning said aperture controlling mechanism for automatic operation in accordance with the position of said pointer as determined by engagement of said feeler member therewith and movable to another position for conditioning said aperture controlling mechanism for manual operation independently of the position of said pointer, characterized by a disengageable clutch in said transmission connection, a light spring tending to move said feeler member away from said pointer, a stronger spring tending to move said control ring in a direction to move said feeler member toward said pointer when said clutch is engaged so that said feeler member moves with said control ring, and means for disengaging said clutch upon movement of said setting member to manual operation position, so that when said clutch is disengaged said feeler member is operatively disconnected from said stronger spring and is free to move under the influence of said light spring.

13. A photographic camera of the type having an exposure meter including a pointer movable through an operating range in accordance with changes in brightness conditions, a camera release member operable to initiate a picture-taking operation, pointer clamping means normally operable by said camera release member to clamp said pointer in stationary position, a feeler member movable into engagement with the clamped pointer, and diaphragm aperture controlling mechanism including a diaphragm aperture control ring, a transmission connection between said control ring and said feeler member to couple one to the other for conjoint movement, and a setting member movable to one position for conditioning said aperture controlling mechanism for automatic operation in accordance with the position of said pointer as determined by engagement of said feeler member therewith and movable to another position for conditioning said aperture controlling mechanism for manual operation independently of the position of said pointer, characterized by a disengageable clutch in said transmission connection, and means controlled by movement of said setting member to manual operation position for disengaging said clutch and concomitantly rendering said pointer clamping means ineffective.

14. A photographic camera of the type having an exposure meter including a pointer movable through an operating range in accordance with changes in brightness conditions, a camera release member operable to initiate a picture-taking operation, pointer clamping means normally operable by said camera release member to clamp said pointer in stationary position, a feeler member movable into engagement with the clamped pointer, and diaphragm aperture controlling mechanism including a diaphragm aperture control ring, a transmission connection between said control ring and said feeler member to couple one to the other for conjoint movement, and a setting member movable to one position for conditioning said aperture controlling mechanism for automatic operation in accordance with the position of said pointer as determined by engagement of said feeler member therewith and movable to another position for conditioning said aperture controlling mechanism for manual operation independently of the position of said pointer, characterized by a disengageable clutch in said transmission connection, and means controlled by movement of said setting member from automatic operation position to manual operation position for concomitantly disengaging said clutch, rendering said pointer clamping means ineffective for future clamping operation, and releasing said pointer clamping means if already in clamping position.

References Cited in the file of this patent

UNITED STATES PATENTS

| | | |
|---|---|---|
| 2,868,095 | Gebele | Jan. 13, 1959 |
| 2,906,166 | Herterich | Sept. 29, 1959 |
| 2,923,216 | Greger | Feb. 2, 1960 |
| 2,925,760 | Broschke | Feb. 23, 1960 |
| 2,969,004 | Gebele | Jan. 24, 1961 |